July 20, 1965 C. KLEESATTEL ETAL 3,196,333

VIBRATING APPARATUS WITH SUPPLY FREQUENCY CONTROL

Original Filed Nov. 2, 1959 3 Sheets-Sheet 1

INVENTORS
CLAUS KLEESATTEL
LEWIS BALAMUTH
ARTHUR KURIS

BY Reuben T. Carlson

Attorney

July 20, 1965 C. KLEESATTEL ETAL 3,196,333

VIBRATING APPARATUS WITH SUFFLY FREQUENCY CONTROL

Original Filed Nov. 2, 1959 3 Sheets-Sheet 2

INVENTORS
CLAUS KLEESATTEL
LEWIS BALAMUTH
ARTHUR KURIS

BY Reuben J. Carlson

Attorney

July 20, 1965 C. KLEESATTEL ETAL 3,196,333

VIBRATING APPARATUS WITH SUPPLY FREQUENCY CONTROL

Original Filed Nov. 2, 1959 3 Sheets-Sheet 3

INVENTORS
CLAUS KLEESATTEL
LEWIS BALAMUTH
ARTHUR KURIS

BY Reuben J Carlson

Attorney

United States Patent Office 3,196,333

Patented July 20, 1965

3,196,333
VIBRATING APPARATUS WITH SUPPLY FREQUENCY CONTROL

Claus Kleesattel, Forest Hills, Lewis Balamuth, New York, and Arthur Kuris, Riverdale, N.Y., assignors to Cavitron Ultrasonics, Inc., Long Island City, N.Y., a corporation of New York Application Aug. 15, 1961, Ser. No. 131,667, which is a division of application Ser. No. 850,406, Nov. 2, 1959, now Patent No. 3,056,698, dated Oct. 2, 1962. Divided and this application Mar. 15, 1963, Ser. No. 265,432
14 Claims. (Cl. 318—118)

This invention relates to vibrating apparatus with supply frequency control, and more particularly to an amplitude indicating and tuning system for indicating the amplitude of vibration and for correspondingly adjusting and maintaining the vibrator unit of a high frequency vibrator assembly at maximum operating efficiency. This application is a division of our copending application Serial No. 131,667, now Patent No. 3,100,853, which was filed as a division of our parent copending application Serial No. 850,406, filed November 2, 1959, and which parent application issued into Patent 3,056,698 on October 2, 1962.

The amplitude indicating and tuning system and apparatus of this invention is designed for association with a vibrator assembly and a power generator for generating biased alternating current of high frequency and which is used to energize and drive the vibrator unit of the vibrator assembly, and wherein the power generator incorporates means associated therewith, and within convenient reach of the operator, for adjusting and tuning the biased alternating current generator, so that its output current which energizes the vibrator unit will have a controlled frequency which matches the optimum resonance frequency of the vibrator unit. The amplitude indicating system and sensing device of this invention is designed to visually indicate to the operator the amplitude of vibration of a component part of the vibrator unit during the work-performing operation, and which visibly informs the operator when the vibrator unit is not operating at its optimum resonance frequency and amplitude, so that the operator can then manually tune the biased alternating current generator to attain optimum resonance vibration of the vibrator unit, as will be indicated by the amplitude gauge associated with the sensing device.

For a better understanding of this invention, the construction and performance characteristics of a typical vibrator assembly with which the tuning and amplitude control system and apparatus of this invention is associated will be briefly explained. Vibrator assemblies designed for drilling, boring and cutting workpieces, agitating fluids, or performing other useful work, customarily include a vibrator unit composed of a transducer and a vibration transmitting line, composed of one or more connecting bodies or tool holders, fixed to one end of the transducer and rigidly connected in linear arrangement. The transducer may be either a piezoelectric, electromechanical or magnetostrictive type. In this embodiment, the magnetostrictive transducer is energized to vibrate in the longitudinal mode by an axially circulating high frequency alternating magnetic field supplied by a surrounding energizing coil whose current is supplied by the biased alternating current generator system. The energized transducer injects vibrations longitudinally into the vibration transmission line, and the connecting body and/or tool holder which form the transmission line, as well as the tool attached thereto, are designed, formed and composed to longitudinally vibrate the work tool at resonance frequency and maximum amplitude over a relatively limited frequency band. In most cases, maximum work is performed when the working end of the work tool vibrates at maximum or peak amplitude, and which maximum amplitude is only attained when the vibrator unit operates at its resonance frequency.

It is thus evident that for optimum work performance, the frequency of the biased alternating current supplied by the generator to the energizing coil which surrounds the transducer, should match the resonance frequency of the transducer and of the vibrator unit as a whole. However, departures from the resonance frequency of the vibrator unit often occur during operation or after tool changes, which is above or below the generated frequency, thus reducing the amplitude of vibration of the vibrator unit and its work tool. Such departures from resonance frequency may be attributed to various causes such as; a drop in frequency of vibration of the vibrator unit caused by a temperature rise in the transducer; a change in tools of different length which may result in a change in the resonance frequency of the tool holder and consequently of the entire vibrator unit; frequency drifts of the generator which may be the result of excessive heating or mal-functioning of a generator component; or changes in the voltage of the line current supplied to the generator.

This invention is designed for association with a biased alternating current generator system which incorporates a tuning circuit whereby the frequency of its biased alternating current output may be adjusted by means of a manually adjustable control knob removed from the generator and within convenient reach of the operator. However, before tuning adjustment can be made, the operator must know whether the vibrator unit is or is not operating at resonance frequency and maximum amplitude. Prior to this invention, no satisfactory means was provided for informing the operator whether the vibrator unit is operating at resonance frequency and maximum amplitude, and the extent to which the energized vibrator unit has departed from maximum or peak amplitude performance. Heretofore, a trained operator could rougly judge by tactile sense or by cavitation results when the vibrator unit was not operating at optimum frequency and amplitude. An amplitude gauge could also be placed in contact with a component of the vibrator unit and some measure of its amplitude taken; or an observation microscope could be trained on a component of the vibrator unit and some indication of its amplitude of vibration obtained. All of the prior methods heretofore used are inaccurate and cumbersome, and not adapted for practical use by a relatively untrained operator when engaged in machining or treating workpieces or agitating fluids or performing other work for which the vibrator assembly was designed.

This invention accordingly embraces a monitoring device in mounted association with a component part of the energized vibrator unit, and which senses the amplitude of vibration of a particular point or area of the vibrator unit component, and then translates the sensed amplitude into variable current which is conducted to an electric meter, after amplification if necessary. The electric meter is connected to or forms a component part of an amplitude gauge which visually and conveniently indicates to the operator at all times the amplitude of vibration of the vibrator unit component whose amplitude of vibration is being sensed. By means of this sensing device and system, the operator can conveniently visually observe at all times any fluctuation in the amplitude of vibration of the energized vibrator unit, and when the amplitude gauge indicates a substantial drop from peak or maximum amplitude, he can easily make a corresponding adjustment of the conveniently accessible control knob of the tuning circuit until the biased alternating current generating system is tuned to drive the vibrator unit at resonance frequency and maximum amplitude as indicated by the movement of the dial of the amplitude indicator. If tuning adjustment does not produce a maximum amplitude indication on the amplitude indicating dial, a defect or mal-function in the generator system or vibrator assembly would be indicated, leading to electrical or mechanical correction.

Other objects and advantages of this invention will become apparent as the disclosure proceeds.

Although the characteristic features of this invention will be particularly pointed out in the claims, the invention itself, and the manner in which it may be made and used, may be better understood by referring to the following description taken in connection with the accompanying drawings forming a part hereof, in which:

Similar reference characters refer to similar parts throughout the several views of the drawings and specification.

Figure 1:
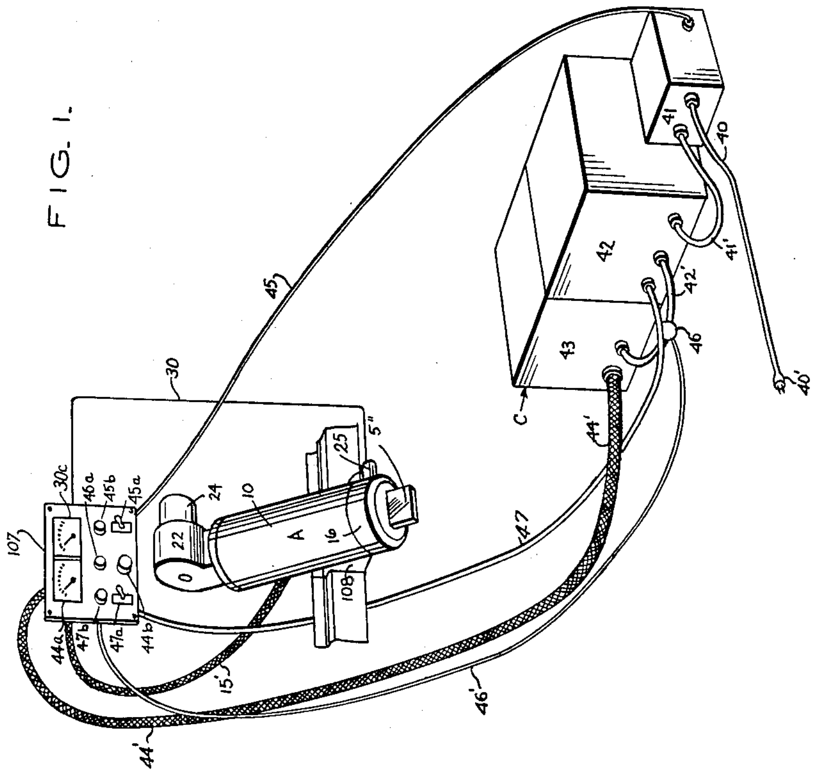
FIG. 1 is a pictorial illustration of a typical form of tuning and amplitude control system and apparatus constructed in accordance with this invention, and which illustrates a typical vibrator assembly, the biased alternating current generator equipment, and the tuning and amplitude instruments of the apparatus.

The amplitude indicating and tuning system and apparatus of this invention is designed for association with a vibrator assembly, such as the vibrator assembly A shown in FIGS. 1–4, and which embraces a tubular housing 10 which contains and supports a vibrator unit 1 whose tool or working face 7 projects beyond one end of the tubular housing 10. The vibrator assembly A may be mounted in inclined or any other convenient position by means of a suitable bracket 108 which may be fixed to a supporting structure. The vibrator assembly A is so supported and mounted that the working end of its vibrator unit is operative to perform the desired work.

The system and apparatus of this invention embraces an amplitude indicator system B, as shown in FIGS. 1, 2, 4, 5, 6 and 7, which includes an amplitude pick-up device 25 supported on the tubular housing 10 of the vibrator assembly A, and which is sensitive to any variations in amplitude exhibited by the vibrator unit 1 of the vibrator assembly A when vibrated. Differential voltage wires extending from the amplitude pick-up device 25 are connected in circuit with an amplifier 30*a*, electric meter 30*b* and an amplitude indicator 30*c* which visibly indicates the performance characteristics of the vibrator unit in terms of its amplitude of vibration.

Figure 2:
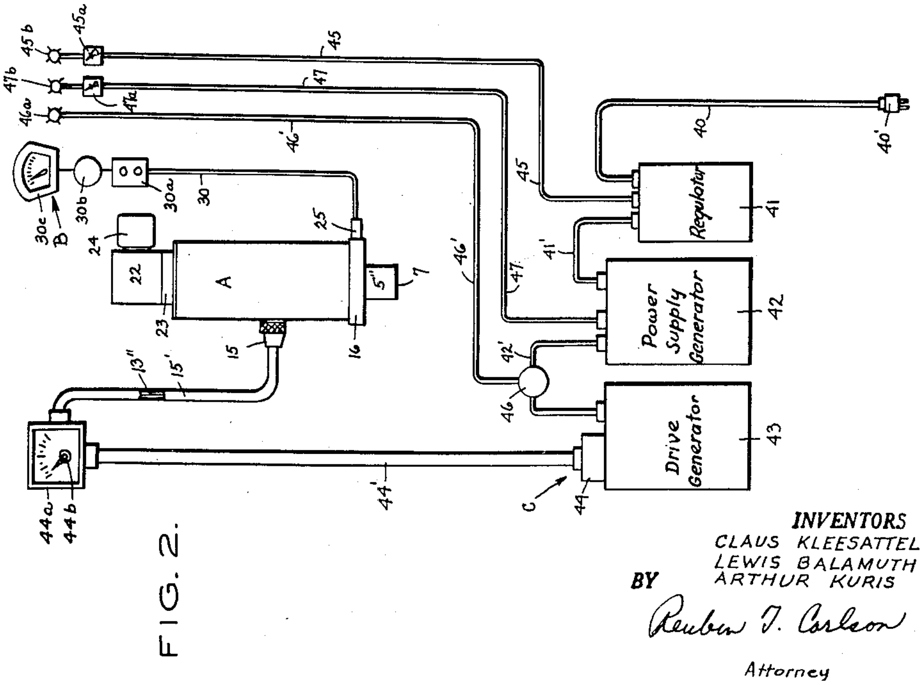
FIG. 2 is a diagrammatic illustration of the biased alternating current generating and tuning and amplitude control system, which supplies high frequency biased alternating current to the vibrator assembly under controlled conditions.

The system and apparatus also embraces a power generating system C as shown in FIGS. 1 and 2, which includes a voltage regulator unit 41, a power supply generator 42, and a power generator unit 43 which may be contained within a suitable portable cabinet and conveniently accessible for replacement and repair. The power generating circuit is powered by normal line current supplied by a power line 40. The power generating system C operates to transform normal line current, such as sixty cycle 115 volt current, into a biased alternating current of high frequency which may be adjusted, tuned and controlled by a frequency control means 44, whose manipulative element 44*b* is mounted on the instrument panel 107 within convenient reach of the operator.

For a better understanding of the amplitude indicating and tuning system and apparatus of this invention, FIGS. 1–4 illustrate a vibrator assembly A whose structural and performance attributes will be first described. The vibrator assembly A essentially comprises a vibrator unit 1 which includes a transducer section 2 connected to the input end of an amplitude magnifying connecting body or acoustical impedance transformer 5 whose output end 7 provides the working or tool face of the vibrator assembly. The transducer section 2, operating at a frequency in the order of five to fifty thousand cycles per second, is composed of a stack of thin magnetostrictive metal plates or laminates 2′ of uniform thickness and preferably concavo-convex in cross-section, and is formed from a metal such as permanickel, permendur or other metal having high tensile strength and is highly magnetostrictive in character, so that the transducer section 2 will longitudinally vibrate to a maximum degree when subjected to the influence of an alternating magnetic field.

Figure 3:
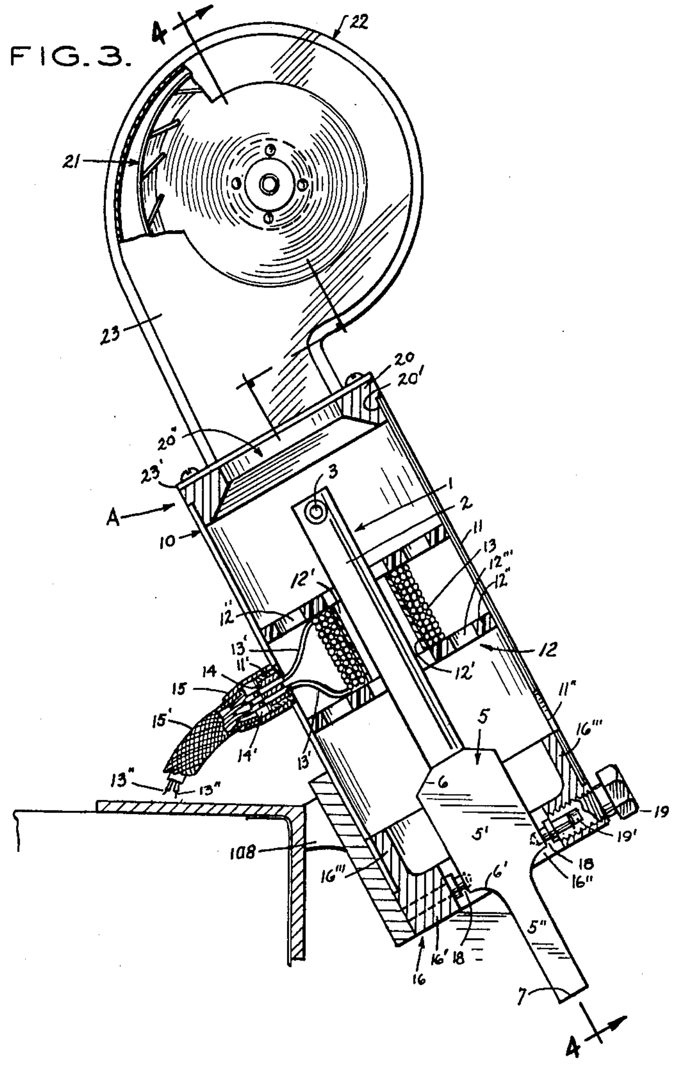
FIG. 3 is a longitudinal section of one form of vibrator assembly with which the tuning and amplitude control system and apparatus of this invention may be associated, and which corresponds to the vibrator assembly shown in FIG. 1.
Figures 4, 5, 6, 7:
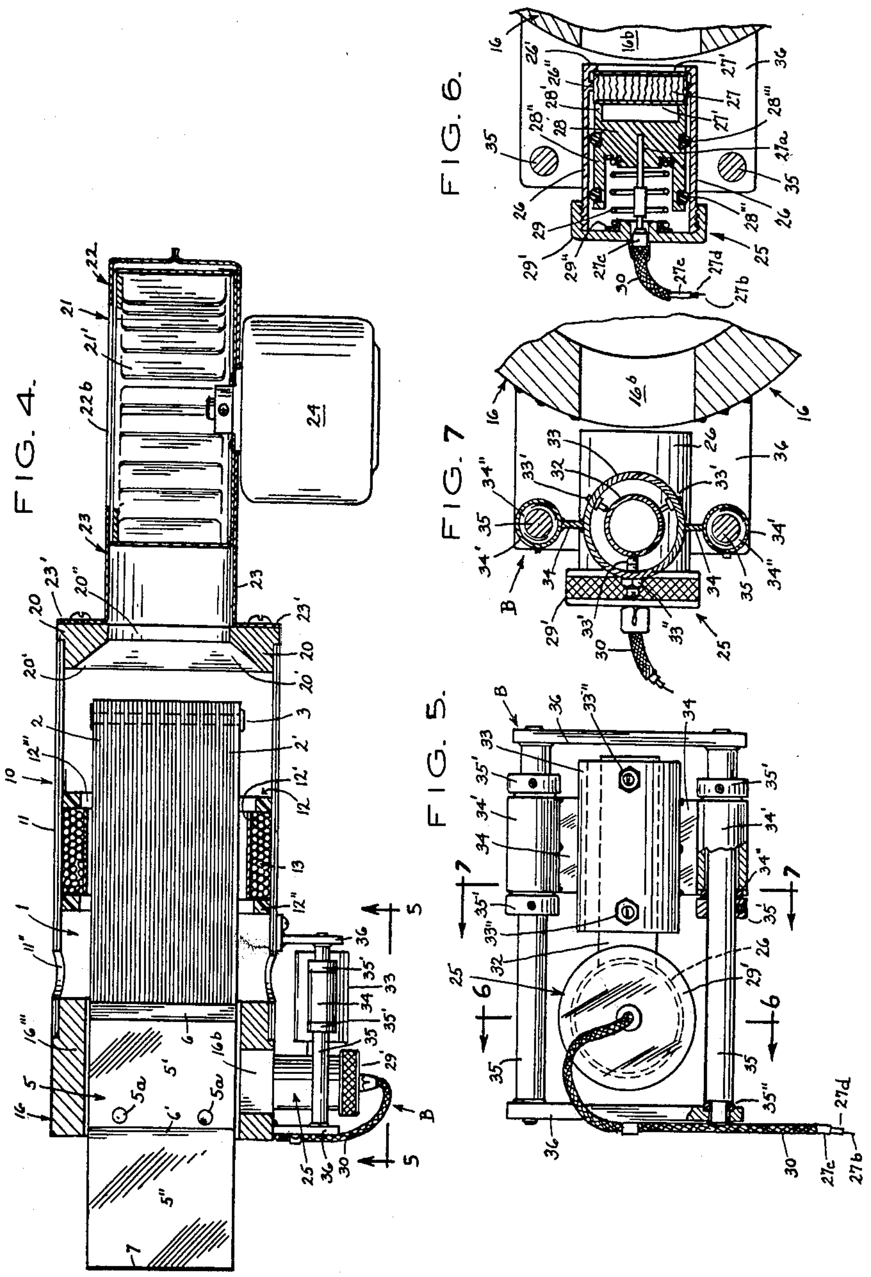
FIG. 4 is another longitudinal section of the vibrator assembly as the same would appear when viewed along line 4—4 of FIG. 3, this view also showing certain parts of an amplitude pick-up device associated therewith and which forms a part of the tuning and amplitude control system of this invention.
FIG. 5 is an elevational view of the amplitude pick-up device and associated support as the same would appear when viewed along line 5—5 of FIG. 4.
FIG. 6 is a transverse section of the amplitude pick-up device as the same would appear when viewed along line 6—6 of FIG. 5.
FIG. 7 is another transverse section of the amplitude pick-up device as the same would appear when viewed along line 7—7 of FIG. 6.

The stacked metal plates 2′ which compose the transducer section 2 may be maintained in compact internested relation as shown in FIGS. 3 and 4, by means of a resilient clamp 3 set within a conforming bore drilled through the plate stack, and which permits differential longitudinal expansion of the compactly stacked plates as may result from variations in temperature to which the stacked plates are subjected when energized by an alternating magnetic field.

The connecting body 5 presents an enlarged body section 5′ which is rigidly secured to the output end of the transducer section 2 as by silver solder, and a reduced body section 5″ of smaller cross-sectional area than the enlarged body section 5′. The substantially flat and rectangular end face 7 of the reduced body section 5″ of the connecting body provides the working or tool attaching face of the vibrator unit. The connecting body 5 should be made of a strong metal, such as monelmetal, titanium, Phosphor-bronze, beryllium copper or the like having high tensile strength and vibration transmitting capabilities. The working face 7 of the vibrator assembly can be used for the cavitation of liquids and the cavitational cleaning of porous objects, and by securing a suitable work tool to the working end of the connecting body 5, various boring, cutting, chipping and drilling operations can be performed with or without the use of abrasive slurries, as is well known in the art.

The transducer section 2 of the vibrator unit 1 should have a length corresponding to one-half wavelength of sound or integral multiples thereof traveling longitudinally through the material of the transducer stack at the vibration frequency of the transducer section; and the connecting body 5 together with any tool attached thereto should have a combined length corresponding to one-half wavelength of sound or integral multiples thereof traveling longitudinally through the material of the connecting body and any tool attached thereto at the vibration frequency of the transducer section. The vibrator unit 1 is designed to produce longitudinal motion strokes at the working face 7 thereof whose amplitude may be in the order of one to three-thousandths of an inch. The length of the longitudinal motion strokes may be designed into the vibrator unit 1 in accordance with the metals from which it is formed, and the acoustical characteristics of the metal, the frequency of vibration, and the length, shape and form of its components as explained in Reissue Patent 25,033.

The transducer section 2 and a major part of the connecting body 5 of the vibrator unit may be contained in a tubular housing 10 which includes a tubular casing 11 formed of a non-magnetic and non-electrical conducting material such as nylon or the like moldable plastic compound, as shown in FIGS. 1 and 3 and 4. The tubular casing 11 contains and supports a winding spool 12 formed of non-magnetic and non-electrical conducting material and which presents a tubular body 12′ in surrounding relation to the transducer section 2 of the vibrator unit, and which is supported by circular side plates 12″ fixed to the tubular body 12′ and whose circular peripheries are in bearing contact with the inside surface of the tubular casing 11.

An enamel coating current conducting wire 13 is wound in a multiplicity of layers on the tubular body 12′ of the winding spool 12 as shown in FIGS. 3 and 4. The tubular body 12′ of the winding spool 12 may be generally rectangular in cross-section, and preferably is only slightly larger than the rectangular cross-section of the intermediate portion of the transducer section 2 which extends therethrough, and so that the energizing winding 13 is positioned in relatively close proximity to the intermediate portion of the transducer section 2. Biased alternating current of selected frequency is supplied to the winding 13 to thereby establish an alternating magnetic field in axially extending relation to the intermediate portion of the transducer section 2, to thereby cause the transducer section to longitudinally vibrate in accordance with the frequency of the biased alternating current and the acoustical characteristics of the metal from which the transducer section 2 is made.

The terminal lead wires 13′ which extend from the winding 13 may be provided with terminal socket connectors which may be molded into a supporting plug 14. The supporting plug 14 snugly seats within an externally threaded collar portion 11′, which may be integrally formed as a part of the tubular casing 11. Insert prongs supported by a companion supporting plug 14′ are designed to be plugged into the socket connectors. The prong supporting plug 14′ may be snugly pocketed within an internally threaded coupling 15 which will be applied to the externally threaded collar portion 11′ of the tubular casing 11. A flexible conduit 15′ contains the current supply wires 13″ which are secured to the terminal prongs. The flexible conduit 15′ and the current supply wires 13″ contained therein lead to a source of biased alternating current of selected frequency as hereafter described.

A vibrator unit supporting collar 16, attached to the head end of the tubular casing 11, may provide substantially the sole support for the vibrator unit 1, as shown in FIGS. 3 and 4. The vibrator unit supporting collar 16 may be formed from a relatively light metal such as aluminum, and has an internal body wall 16′ presenting a conforming hole 16″ therein through which the enlarged body section 5′ of the connecting body 5 extends. The supporting collar 16 may be provided with an inset flange portion 16‴ over which the head end of the tubular casing 11 may be snugly telescoped and secured as by suitable screws.

The vibrator unit 1 may be held in operative position by three studs 18, two of which are positioned along one of the broad sides of the vibrator unit connecting body 5. The third stud 18 is positioned adjacent the opposite broad side of the vibrator unit connecting body. Each of the three studs 18 presents a body portion, an enlarged head portion, and a centering crown designed to seat snugly wtihin a conforming pocket 5*a* formed in the adjacent broad side face of the enlarged body section 5′ of the vibrator unit 1. The centering crowns of the two adjacent supporting studs 18 provide bearing support for the adjacent broad side of the enlarged body section 5′ of the connecting body 5 of the vibrator unit. The third supporting stud 18 on the opposite broad side of the connecting body 5 of the vibrator unit has a body portion which extends into a socket hole 19′ formed in the end of an externally threaded plug 19 which is threaded into a threaded bore extending radially through the body wall 16′ of the supporting collar 16. The threaded plug 19 an exposed head portion which may be externally manipulated to move the crown portion of the third stud 18 into the adjacent conforming hole of the connecting body 5 by rotative manipulation of the threaded plug 19. The centering crowns of the three supporting studs 18 are positioned to engage the connecting body 5 of the vibrator unit 1 in the approximate area of a node of longitudinal vibration thereof. By manipulating the exposed head portion of the threaded plug 19, the centering crown of its stud 18 may be withdrawn from the adjacent centering pocket formed in the connecting body 5, and the entire vibrator unit 1 then withdrawn from the housing 10. In like manner, the threaded plug 19 may be manipulated so that the centering crown of tis stud 18 seats in the adjacent conforming pocket formed on the adjacent side of the connecting body 5 to firmly secure the vibrator unit in mounted position between the centering crowns of the three studs 18, with the reduced body section 5″ of the vibrator unit 1 extending beyond the body wall 16′ of the supporting collar 16.

Since the transducer section 2 generates heat during vibration, it is desirable to provide a coolant in surrounding relation to the transducer section 2 to maintain the transducer section 2, connecting body 5 and surrounding tubular housing 10 in relatively cool condition. This may be accomplished by driving a stream of cooling air through the tubular casing 11 as by means of a turbine type fan 21 having radial vanes 21*b* contained in a fan casing 22 having an axial air inlet 22*b* and an air stream directing throat section 23 connected to the tail end of the tubular casing 11, as shown in FIGS. 3 and 4. This connection may be made by the provision of an end collar 20, as shown in FIGS. 3 and 4, having an inset shoulder portion 20′ which telescopes into the tail end of the tubular casing 11 and is suitably secured thereto as by securing screws. The end closure collar 20 has an air inlet hole 20″ therein which conforms to the area of the air inlet throat section 23 of the fan casing 22. The air inlet throat section 23 of the fan casing 22 may be provided with flared flanges 23′ secured to the exterior end face of the end collar 20 as by suitable screws as shown in FIG. 4. The fan 21 is driven by a fractional horsepower constant speed motor 24 whose casing is secured to the adjacent side wall rim of the fan casing 22.

Since an air flow in the order of ten cubic feet per minute is sufficient to supply adequate cooling of the transducer section 2 and connecting body 5 of the vibrator unit 1 as well as the housing 10, a relatively small turbine type fan 21 driven by a small fractional horsepower motor 24 is sufficient to generate the required air stream. The generated air stream freely flows around the transducer section 2 and a portion of the connecting body 5, and also through spaced air holes 12‴ formed in the circular side plates 12′ of the winding supporting spool 12. The warmed air escapes through a series of spaced holes 11″ formed in the circular wall of the tubular casing 11 adjacent the inset flange portion 16‴ of the vibrator unit supporting collar 16. The transducer-attached section 5′ of the connecting body 5 may be provided with tapered end faces 6, and the section 5′ may be made to merge with the output section 5″ through inclined side faces 6′ as shown in FIGS. 3 and 4.

*Amplitude indicating and tuning circuits*

To produce optimum vibratory power, the working or tool face 7 of the vibrator unit should vibrate at resonance frequency, and the power generating circuit C should accordingly be designed to supply biased alternating current within a limited optimum frequency range to insure vibration of the vibrator unit at resonance frequency. In order to supply biased alternating current to the winding 13 of the vibrator assembly A at optimum cyclic frequency, the biased alternating current generating system C is provided with tuning means 44 under the control of the operator. To detect any malfunctioning of the power generating system C or the vibrator assembly A, so that desired adjustments can be made to restore the system to optimum frequency and amplitude, some monitoring means for measuring the vibration amplitude or cyclic frequency at which the vibrator unit 1 is vibrating, is a desirable requisite. Since the amplitude of vibration varies with the frequency of vibration, the frequency of vibration can be determined by monitoring any variations in the amplitude of vibration of the connecting body 5 of the vibrator unit in the area of a loop of longitudinal vibration or a loop of radial vibration thereof.

In the apparatus of this invention, the amplitude of vibration of the connecting body 5 of the vibrator unit 1 is registered by an amplitude indicator system B which includes the amplitude pick-up device 25 which may be made in several forms. For purposes of illustration, one form of amplitude pick-up device which may be used may be mounted on the vibrator unit supporting collar 16 as shown more particularly in FIGS. 4, 5, 6 and 7, and which may comprise an open-ended cylindrical cartridge 26 made from electrical conductive material which contains a piezoelectric crystal 27, formed of such materials as quartz or barium titanate. The piezoelectric crystal 27 is so positioned and oriented that it is effectively responsive to the acoustical waves emanating from the area of a node of longitudinal motion, or an anti-node of lateral motion, of the connecting body 5 of the vibrator unit 1 during vibration thereof. The acoustical waves emanating from the area of a node of longitudinal motion (anti-node of lateral motion) of the connecting body 5 emerge through a window hole 16*b* in the supporting collar 16, and the piezoelectric crystal 27 should be so mounted and oriented that it is responsive to compressional waves generated by either the longitudinal oscillations of the connecting body 5, or the lateral waves or breathing oscillations of the connecting body 5 at the nodal area thereof. While the longitudinal waves, and the lateral acoustical waves generated at the nodal plane of longitudinal motion of the connecting body 5, are not equal, they are nevertheless proportional, and therefore either source wave may be used to measure the longitudinal amplitude of vibration at the working face 7 of the vibrator unit 1.

The piezoelectric crystal 27 is periodically deformed by the alternating pressure of the acoustical waves generated by the lateral vibrations of the adjacent side face of the vibrating connecting body at the nodal area thereof, and while these periodic deformations are extremely minute, the quartz or barium titanate or like substance of which the crystal 27 is composed, nevertheless generates from these periodic or cyclic deformations a correspondingly small voltage of about twenty microvolts on the opposite sides of the crystal which is proportional to the length of the periodic deformations. A piezoelectric crystal 27 is selected which has a flat response over the working frequency range, so as to insure an accurate indication of the displacement amplitude. The opposite side faces of the piezoelectric crystal 27 are coated with an electrical conducting material 27′, such as silver. One silver coated surface 27′ seats against the inturned end rim portion 26′ of the electrical conductive cylindrical cartridge 26 and is thereby grounded.

It is important that the piezoelectric crystal 27 be firmly supported on the inturned rim portion 26′ of the cylindrical cartridge without movement. This may be accomplished by providing an adjacent abutment shoulder 26″ which properly centers the crystal within the cylindrical cartridge 26 so that the major part of the cylindrical surface of the crystal is out of contact with the inner face of the cylindrical cartridge 26. The crystal 27 is maintained firmly seated on the circular rim portion 26′ by a plug 28 formed from electrical conductive material. The plug 28 has a body portion which presents a circular seating flange 28′ bearing against the adjacent silver coated surface 27′ of the crystal 27. The bearing plug 28 also presents a circular guide wall 28″ extending from the other end of its body portion. The outer surface of the plug 28 is insulated from the electrical conductive cylindrical cartridge 26 by a pair of non-electrical conducting O-rings 28‴ which seat within circumferentially extending grooves formed in the plug 28, and which bear against the inner surface of the cartridge 26.

A coiled compression spring 29 seats against the body portion of the plug 28 and is held under compression by an internally threaded closure cap 29′ which may be applied to external threads formed on the cylindrical cartridge 26. One end of the coil spring 29 seats against a non-conductive washer 29″ and is thereby insulated from the conductive closure cap 29′. When the closure cap 29′ is applied to the cylindrical cartridge 26, the compression spring 29 exerts a corresponding pressure against the plug 28 so that its circular flange 28′ applies corresponding pressure against the conductive rim of the piezoelectric crystal 27 to thereby provide conductive contact therewith and to also maintain the crystal in firm seating relation against the inturned rim portion 26′ at the end of the cylindrical cartridge 26.

Since the plug 28 is made of electrical conductive material, the minute voltage developed at the adjacent silver coated face 27′ of the crystal 27 is transmitted into the conducting plug 28 and tapped off therefrom by contact prong 27*a* extending into the plug 28 and connected to a very fine wire 27*b* which leads into an insulating sheath 27*d* as shown in FIG. 6. Since the closure cap 29′ for the cylindrical cartridge 26 is also made of electrical conductive material, it provides with the cartridge 26 a ground for the opposite face 27′ of the crystal 27. The conductive closure cap 29′ is in conductive contact with an outer grounding sheath 27*c* which surrounds the inner non-conductive sheath 27*d*. A feeble but nevertheless measurable variable current will flow through the fine wires 27*b* and the outer conductive sheath 27*c* which may be enclosed within a flexible protective conduit 30.

The variable current conductors 27*b* and 27*c* contained in the protective conduit 30 lead to a transistor amplifier 30*a*, as diagrammatically illustrated in FIG. 2, where this feeble current differential is greatly amplified and thus made more readily measurable. The amplifier 30*a* is in turn connected to a voltmeter 30*b* which is designed to measure the amplified voltage differential produced at the opposite silver coated surfaces 27′ of the piezoelectric crystal 27 as a result of variations in acoustical compression waves generated by the lateral vibrations of the adjacent side of the vibrating connecting body 5 of the vibration unit 1. Since it is desirable to visually indicate to the operator the variations in voltage thus produced in terms of variations in amplitude of the vibrating connecting body 5, an amplitude indicator instrument 30*c* is provided which translates the variations in electrical potential at the voltmeter 30*b* into amplitude indications on an amplitude scale and pointer forming a part of the amplitude indicator 30*c* as shown in FIGS. 1 and 2.

In this manner, variations in amplitude of vibration of the connecting body 5 of the vibrator unit 1, are visually evident to the operator on the amplitude indicator 30*c*. Since the power generating circuit C, which will presently be described, is designed to operate within a predetermined frequency range which determines the amplitude of vibration of the connecting body 5, optimum vibration amplitude of the connecting body can be maintained and visibly indicated on the amplitude indicator 30*c*, by a corresponding tuning adjustment of the biased alternating current generating circuit C.

The cylindrical cartridge 26, and the piezoelectric crystal 27, pressure plug 28 and compression spring 29 contained therein, may be supported in operative relation to the window hole 16b of the vibrator unit supporting collar 16 by any suitable means which serve to cushion and protect the piezoelectric crystal 27 from the influence of acoustical waves emanating from all vibratory parts of the vibrator assembly A, except its connecting body 5. Such means can comprise a tubular handle 32, which may be formed integral with the cylindrical wall of the cartridge 26. It is also important that the tubular handle 32, as well as the cartridge 26 which contains the piezoelectric crystal 27, be supported in such manner that the same is subjected to a minimum of external vibration, with minimum dampening of the variations in voltage potential produced at the conductive surfaces 27' of the piezoelectric crystal 27. Accordingly, the tubular handle 32 may be inserted into a tubular cylinder 33 of larger diameter and supported therein by two sets of three small supporting studs 33' extending inwardly from the cylindrical wall of the tubular supporting cylinder 33, as shown in FIGS. 5 and 7. One of the three studs 33' of each set may be set within a socket formed in the end of an externally threaded plug 33'' extending through a threaded hole in the supporting cylinder 33 and adjustably locked in position by an adjusting nut as shown in FIG. 7.

The supporting cylinder 33 may be provided with diametrically opposed and laterally extending wings 34 which terminate in tubular sleeves 34' through which a pair of supporting rods 35 are telescoped. The ends of the rods 35 are supported by a pair of brackets 36, one of which may be fixed to the vibrator unit supporting collar 16 and the other bracket may be suitably fixed to the tubular casing 11 of the vibrator assembly. The tubular sleeves 34' may be laterally adjusted on the supporting rods 35, to thereby center the piezoelectric crystal 27a as supported by the cylindrical cartridge 26 over the window hole 16b and adjacent side of the connecting body 5, and thus held in this adjusted position by means of locking collars 35' fixed as by set screws to the rods 35 at the opposite ends of the tubular sleeves 34'. As a shield against any external vibrations, resilient O-rings 34'' may be positioned between the bearing sleeves 34' and the supporting rod 35 extending therethrough, and similar O-rings 35'' may be positioned to extend around the terminal ends of the rods 35 in the area of attachment to the supporting brackets 36 to thereby provide non-vibrator support for the rods 35.

The power generating circuit C as shown in FIGS. 1 and 2 supplies biased alternating current of adjustable frequency. If the vibrator unit 1 is designed to vibrate, for example, at a resonance frequency of twenty thousand cycles per second, the power generating circuit would be adjusted to operate at this same optimum frequency, and to supply biased alternating current to the supply wires 13'' which lead to the transducer section energizing winding 13 at this frequency. Normal alternating line current which may be sixty cycle A.C. and approximately one hundred and ten volts, is supplied to the generator system by current supply line 40 whose source plug 40' is plugged into line current. Since the line current may fluctuate in voltage, the current supply line 40 is connected to a voltage regulator unit 41 which stabilizes the voltage to a fixed value, so that uniform sixty cycle 115 volt current flows from the output line 41' of the voltage regulator unit 41 into a power supply generator unit 42. The power supply generator unit 42 converts the uniform voltage sixty cycle alternating input current to direct current which is conducted through the direct current output line 42' to a driven generator unit 43.

The drive generator 43 converts the input direct current, supplied through cable 42' by the power supply generator 42, to an alternating current having a preferred frequency of approximately fifteen to thirty thousand cycles per second. A direct current bias is also imposed upon the alternating current produced by the drive generator 43. The drive generator 43 is also equipped with a variable tuning circuit 44 whereby the frequency of the biased alternating current output flowing into its output cable 44' may be tuned to the optimum frequency range at which the vibrator unit 1 will vibrate at resonance frequency. The output line 44' of the tuning circuit 44 leads to a tuning instrument 44a by means of which the tuning circuit 44 may be manually adjusted. The tuning instrument 44a may present an indicating dial which registers the operating frequency of the power generator 43 and also presents a control knob 44b within convenient reach of the operator as shown in FIG. 1, and by means of which the operating frequency of the generator may be tuned or adjusted. The tuning instrument 44a is connected to the input cable 15' which contains the current wires 13'' leading to the winding 13, which forms a part of the vibrator assembly A.

Since the vibrator unit 1 is designed to operate at a predetermined optimum resonance amplitude and frequency, any variation from optimum amplitude will be registered on the amplitude indicator 30c. The control knob 44b of the tuning instrument 44a can be manually manipulated to adjust the tuning circuit 44 of the power generator 43 to optimum operating frequency, which results in the restoration of the operating vibration unit 1 to optimum resonance amplitude and frequency.

The voltage regulator 41 is connected by control line 45 to a remote control power switch 45a mounted on the instrument panel 107 of the apparatus as shown in FIGS. 1 and 2, and whereby the power to the power supply generator 42, drive generator 43, and vibrator assembly A may be turned on or off. An electric light bulb 45b is connected to the on-off switch 45a and mounted on the instrument panel 107 to indicate when the power is on or off.

Since the driven generator 43 contains filament tubes which must first be heated up to avoid damage thereto before the vibrator assembly A is placed in operation, a time delay instrument 46 is positioned on the line 42' which connects the power supply generator 42 to the drive generator 43. In an interval of about one minute, the filament tubes will be properly heated for operation, and when sufficiently heated, the time delay instrument 46 will pass current through lead line 46' to light an electric bulb 46a mounted on the instrument panel 107 as shown in FIG. 1. When the bulb 46a is thus lighted, the vibrator assembly A can be put into operation. This is effected by tripping an operate switch 47a joined to the power supply generator 42 by control line 47. When the operate switch 47a is "on," a light bulb 47b connected thereto is lighted. The operate switch 47a and light bulb 47b are both mounted on the instrument panel 107 of the apparatus as shown in FIG. 1, and operate switch 47a is placed in "on" position when the time delay bulb 46a is lighted.

From the above description, it is apparent that the power generator circuit C is placed in operation by first tripping switch 45a so that the current is supplied to the power supply generator 42 and drive generator 43. When the delay instrument 46 operates to light the light bulb 46a, the operate switch 47a may be closed, and biased alternating current will then flow from the power generator 43 through power cable 44' and to the winding 13 of the vibrator assembly A which drives the vibrator unit. Optimum vibrating frequency and amplitude at the working face 7 of the vibrator assembly is obtained by observing the operating amplitude registered by the amplitude indicator 30c, and then adjusting the tuning control knob 44b to thereby tune the power generator circuit C to a frequency which will produce the optimum amplitude reading on the amplitude indicator 30c.

While the vibrator assembly A may be designed to longitudinally vibrate the tool or working face 7 of its vivibrator unit at any desired frequency in the order of from five to fifty kc. per second, it has been found that vibrations in the ultrasonic frequency range of fifteen to thirty kc. are preferred for most work operations. In this connection, it will be appreciated that the vibrator unit is constructed, proportioned and designed to vibrate at resonance at the preferred frequency of operation, and that the generating system C is so designed and tuned as to operate at the optimum resonance frequency of the vibrator unit 1. In a frequency range of fifteen to thirty kc., the vibrator assembly A may be designed and adjusted to longitudinally vibrate the working or tool face 7 at an amplitude in the order of approximately one-half thousandths to approximately three-thousandths of an inch. It will be appreciated that the tool or working face 7 of the vibrator unit 1 of the vibrator assembly A has a shape and area best suited to the work to be performed.

The power input required to vibrate the vibrator unit 1 of the vibrator assembly A is dependent upon the total mass of the vibrator unit 1, the area of its tool or working face 7, the frequency at which it is to be vibrated and other factors. Under these conditions, the power input may vary from a low of approximately 100 watts to as high as 5,000 watts or higher.

The amplitude pick-up device 25 and associated amplitude monitoring system B provides a convenient means for determining the amplitude of vibration of the connecting body 5 and its working face 7, whose preferred resonance amplitude is a known factor designed into the vibrator unit 1. The operating amplitude is conveniently revealed to the operator by the amplitude indicator 30*c* mounted on the instrument panel 107, and when the operating amplitude of the connecting body 5 drops below its optimum resonance amplitude, the power generating circuit C may be tuned by adjusting the control knob 44*b* to thereby restore the vibrating connecting body 5 to optimum resonance frequency.

By making the working face 7 of the vibrator assembly A of appropriate shape, the apparatus of this invention can be advantageously and effectively employed for the cavitational cleaning of a wide range of intricate objects and articles, such as porous filters, bearing assemblies, clock and watch works, instrument assemblies and like devices whose intricate working elements present minute pores, cavities, passages or interstices containing impacted debris or other foreign material which must be thoroughly removed. As is generally known in the art, the working face 7 may constitute a work tool, or a work tool having a working end which may be rigidly attached thereto, with the working face or work tool appropriately shaped for use in boring, cutting, chipping, forming or shaping numerous hard materials, with or without the use of abrasive slurries.

While certain novel features of this invention have been disclosed herein and are pointed out in the claims, it will be understood that various omissions, substitutions, and changes may be made by those skilled in the art, without departing from the teachings of this invention.

What is claimed is:

1. A vibrator apparatus which includes, a vibrator unit having a magnetostrictive transducer section, a connecting body having one end thereof rigidly fixed to the adjacent end of the transducer section and whose opposite end is to be vibrated to perform work, and means for energizing said transducer section to thereby vibrate said vibrator unit at anti-node areas thereof; and a device for detecting and monitoring variations in the amplitude of vibration of the energized vibrator unit, said device including a vibration sensitive transducer, means for supporting said vibration sensitive transducer in vibration responsive relation to an anti-node area of said vibrator unit and in vibration insulated relation to other vibratory parts of said apparatus, conductors connected to said transducer through which variations in electrical potential generated by said vibration sensitive transducer are transmitted when said vibrator unit is energized, an amplifier connected to said conductors for amplifying the electrical potential to a substantially higher value, and means for translating said amplified electrical potential in terms of variations in amplitude of vibration of said energized vibratory unit.

2. A vibrator apparatus which includes, a vibrator unit having a magnetostrictive transducer section, a connecting body having one end thereof rigidly fixed to the adjacent end of the transducer section and whose opposite end is to be vibrated to perform work, and means for energizing said transducer section to thereby longitudinally vibrate said vibrator unit at anti-node areas thereof, and a device for detecting and monitoring variations in the amplitude of the vibration of the energized vibrator unit, said device including a vibration sensitive piezoelectric transducer, means for supporting said vibration sensitive transducer in vibration responsive relation to an anti-node area of said vibrator unit and in vibration insulated relation to other vibratory parts of said apparatus, conductors connected to said transducer through which variations in electrical potential generated by said vibration sensitive transducer are transmitted when said vibrator unit is energized, and amplifier connected to said conductors for amplifying the electrical potential to a substantially higher value and means for translating said amplified electrical potential in terms of variations in amplitude of vibration of said energized vibratory unit.

3. A vibrator apparatus which includes, a vibrator unit having a magnetostrictive transducer section and a connecting body having one end thereof rigidly fixed to the adjacent end of the transducer section and whose opposite end is to be vibrated to perform useful work; means for energizing said transducer section to thereby vibrate said vibrator unit at anti-node areas thereof, said energizing means including a biased alternating current winding in surrounding relation to said transducer section, a generator connected to said winding and operative to translate line current into biased alternating current of high frequency, and a tuning circuit in electrical association with said generator; a device for detecting and monitoring variations in the amplitude of vibration of the energized vibrator unit, said device including a vibration sensitive transducer, means for supporting said vibration sensitive transducer in vibration responsive relation to an anti-node area of said vibrator unit and in vibration insulated relation to other vibratory parts of said apparatus, conductors connected to said transducer through which variations in electrical potential generated by said vibration sensitive transducer are transmitted when said vibrator unit is energized, an amplifier connected to said conductors for amplifying the electrical potential to a substantially higher value, and means for translating said amplified electrical potential in terms of variations in vibration of said energized vibratory unit; and means for variably adjusting said tuning circuit in accordance with variations in vibrations of said vibrator unit as indicated by said monitoring device to thereby maintain said energized vibrator unit at substantially resonance frequency during the work performing operation.

4. A vibrator apparatus which includes a vibrator unit having a magnetostrictive transducer section and a connecting body having one end thereof rigidly fixed to the adjacent end of the transducer section and whose opposite end is to be vibrated to perform useful work; and means for energizing said transducer section to thereby longitudinally vibrate said vibrator unit at high frequency and relatively small amplitude, said energizing means including a biased alternating current winding in surrounding relation to said transducer section, a power generating system electrically connected to said winding which includes a voltage regulator designed to be connected to a source of alternating current, a power supply generator electrically connected to said voltage regulator, a drive generator electrically connected to said power supply generator and said winding, a remote control switch electrically connected to said power generating system for controlling the operation thereof, a time delay switch connected in electrical circuit with said power generating system and operative to control the flow of current through said power supply generator and to said drive genertor, a tuning circuit in electrical association with said power generating system which is operative to control the frequency of the biased alternating current supplied to said winding, and remote control means electrically connected to said tuning circuit whereby the frequency of vibrations of said vibrator unit may be adjusted and maintained at substantially its resonance frequency.

5. A vibrator apparatus which includes, a vibrator unit having a magnetostrictive driving transducer, a vibration transmitting connecting body having one end thereof rigidly fixed to one end of said driving transducer and whose opposite end is to be vibrated to perform work, means for energizing said driving transducer to thereby longitudinally vibrate said connecting body, said vibration transmitting connecting body having a longitudinal length substantially corresponding to one-half wavelength of sound or integral multiples thereof traveling longitudinally through the material thereof at the frequency of vibration of said driving transducer when energized and whereby said connecting body presents at least one anti-node of radial vibration at a transverse cross-section thereof, a device for detecting and monitoring variations in the amplitude of vibration of said connecting body, said device including a vibration sensitive means, means for supporting said vibration sensitive means in vibration responsive relation and adjacent an anti-node area of radial vibration of said connecting body and in vibration insulated relation to other vibratory parts of said apparatus, conductors extending from said vibration sensitive means through which variations in electrical potential generated by said vibration sensitive means are transmitted when said connecting body is vibrated by said energized driving transducer, and means for translating the variations in electrical potential transmitted by said conductors into variations in amplitude of vibration of said connecting body when driving transducer is energized.

6. A vibrator appartus which includes, a vibrator unit having a magnetostrictive driving transducer, a vibration transmitting connecting body having one end thereof rigidly fixed to one end of said driving transducer and whose opposite end is to be vibrated to perform work, means for energizing said driving transducer to thereby longitudinally vibrate said connecting body, said vibration transmitting connecting body having a longitudinal length substantially corresponding to one-half wavelength of sound or integral multiples thereof traveling longitudinally through the material thereof at the frequency of vibration of said driving transducer when energized and whereby said connecting body presents at least one anti-node of radial vibration along the length thereof, a device for detecting and monitoring variations in the amplitude of vibration of said connecting body, said device including a vibration sensitive means, means for supporting said vibration sensitive means in vibration responsive relation and adjacent an anti-node area of radial vibration of said connecting body and in vibration insulated relation to other vibratory parts of said apparatus, conductors extending from said vibration sensitive means through which variations in electrical potential generated by said vibration sensitive means are transmitted when said connecting body is vibrated by said energized driving transducer, an amplifier connected to said conductors for amplifying the electrical potential to a substantially higher value, and means for translating the variations in electrical potential transmitted by said amplifier into variations in amplitude of vibration of said connecting body when said driving transducer is energized.

7. A vibrator apparatus which includes, a vibrator assembly which embraces a vibrator unit having a magnetostrictive driving transducer, a vibration transmitting connecting body having one end thereof rigidly fixed to one end of said driving transducer and whose opposite end is to be vibrated to perform work, a housing containing said transducer and at least a part of said connecting body, an energizing coil supported by said housing and positioned in surrounding relation to said driving transducer which energizes said transducer with resultant longitudinal vibration of said connecting body, said vibration transmitting connecting body having a longitudinal length substantially corresponding to one-half wavelength of sound or integral multiples thereof traveling longitudinally through the material thereof at the frequency of vibration of said driving transducer when energized and whereby said connecting body presents at least one anti-node of radial vibration along the length thereof, and means associated with said housing for removably and replaceably supporting said vibrator unit; a device for detecting and monitoring variations in the amplitude of vibration of said connecting body, siad device including a vibration sensitive means, means associated with said housing for supporting said vibration sensitive means in vibration responsive relation to an anti-node area of radial vibration of said connecting body and in vibration insulated relation to other vibratory parts of said apparatus, conductors extending from said vibration sensitive means through which variations in electrical potential generated by said vibration sensitive means are transmitted when said connecting body is vibrated by said energized driving transducer, and means for translating the variations in electrical potential transmitted by said conductors into variations in amplitude of vibration of said connecting body when said driving transducer is energized, said vibrator unit being removable from said housing and replaceable into said housing in supported relation to said vibrator unit supporting means and in proper operative relation to said energizing coil and vibration sensitive means without re-adjustment thereof.

8. A vibrator apparatus which includes, a vibrator unit having a magnetostrictive driving transducer, a vibration transmitting connecting body having one end thereof rigidly fixed to one end of said driving transducer and whose opposite end is to be vibrated to perform work, means for energizing said driving transducer to thereby longitudinally vibrate said connecting body, said vibration transmitting connecting body having a longitudinal length substantially corresponding to one-half wavelength of sound or integral multiples thereof traveling longitudinally through the material thereof at the frequency of vibration of said driving transducer when energized and whereby said connecting body presents at least one anti-node of radial vibration along the length thereof, a device for detecting and monitoring variations in the amplitude of vibration of said connecting body, said device including vibration sensitive means, means for supporting said vibration sensitive means in vibration responsive relation adjacent an anti-node area of radial vibration of said connecting body and in vibration insulated relation to other vibratory parts of said apparatus, conductors electrically connected to said vibration sensitive means through which variations in electrical potential generated by said vibration sensitive means are transmitted when said connecting body is vibrated by said energized driving transducer, and an amplitude indicating instrument electrically connected to said conductors and mounted remote from said vibrator unit but conveniently within the visual range of the operator, said amplitude indicating instrument having a visually accessible amplitude scale and pointer, and means associated with said amplitude indicating instrument for translating variations in electrical potential transmitted by said vibration sensitive means into variations in amplitude of vibration of said connecting body when said driving transducer is energized, and which variations in amplitude of vibration are visually indicated by said pointer on the amplitude scale of the instrument.

9. A vibrator apparatus which includes, a vibrator unit having a magnetostrictive driving transducer and a vibration transmitting connecting body having one end thereof rigidly fixed to the adjacent end of the driving transducer and whose opposite end is to be vibrated to perform useful work, means for energizing said driving transducer to thereby longitudinally vibrate said connecting body, said vibration transmitting connecting body having a longitudinal length substantially corresponding to one-half wavelength of sound or integral multiples thereof traveling longitudinally through the material thereof at the frequency of vibration of said driving transducer when energized and whereby said connecting body presents at least one anti-node area of vibration along the length thereof, said energizing means including a biased alternating current winding in surrounding relation to said driving transducer, a generator connected to said winding and operative to translate line current into biased alternating current of high frequency, a tuning circuit in electrical association with said generator for adjusting the frequency of the biased alternating current input to said energizing winding, a device for detecting and monitoring variations in the amplitude of vibration of the connecting body when said driving transducer is energized, said device including vibration sensitive means, means for supporting said vibration sensitive means in vibration responsive relation adjacent an anti-node area of vibration of said connecting body and in vibration insulated relation to other vibratory parts of said apparatus, conductors electrically connected to said vibration sensitive means through which variations in electrical potential generated by said vibration sensitive means are transmitted when said vibrator unit is energized, means for translating said amplified electrical potential in terms of variations in amplitude of the connecting body of said energized vibratory unit, and means for variably adjusting said tuning circuit in accordance with variations in amplitude of the connecting body of said vibrator unit as indicated by said monitoring device to thereby adjust and maintain the frequency of the biased alternating current input to said driving transducer winding in substantially frequency match with the resonance frequency of said vibrator unit during the work performing operation.

10. A vibrator apparatus which includes, a vibrator unit having a magnetostrictive driving transducer and a vibration transmitting connecting body having one end thereof rigidly fixed to the adjacent end of the driving transducer and whose opposite end is to be vibrated to perform useful work, means for energizing said driving transducer to thereby longitudinally vibrate said connecting body, said vibration transmitting connecting body having a longitudinal length substantially corresponding to one-half wavelength of sound or integral multiples thereof traveling longitudinally through the material thereof at the frequency of vibration of said driving transducer when energized and whereby said connecting body presents at least one anti-node of radial vibration along the length thereof, said energizing means including a biased alternating current winding in surrounding relation to said driving transducer, a generator connected to said winding and operative to translate line current into biased alternating current of high frequency, a tuning circuit in electrical association with said generator for adjusting the frequency of the biased alternating current input to said energizing winding, a device for detecting and monitoring variations in the amplitude of vibration of the connecting body when said driving transducer is energized, said device including vibration sensitive means, means for supporting said vibration sensitive means in vibration responsive relation to an anti-node area of said connecting body and in vibration insulated relation to other vibratory parts of said apparatus, conductors extending from said vibration sensitive means through which variations in electrical potential generated by said vibration sensitive means are transmitted when said vibrator unit is energized, an amplitude indicating instrument electrically connected to said conductors but mounted remote from said vibrator unit and conveniently within the visual range of the operator, said amplitude indicating instrument having a visually accessible amplitude scale and pointer, and means associated with said amplitude indicating instrument for translating variations in electrical potential transmitted by said conductors into variations in amplitude of vibration of said connecting body when said driving transducer is energized, and which variations in amplitude of vibration are indicated by said pointer on the amplitude scale of the instrument, and means conveniently accessible to the operator for variably adjusting said tuning circuit to thereby restore the frequency of the biased alternating current output of said generator as supplied to said transducer energizing winding into matching relation to the resonance frequency of the energized vibrator unit as indicated by said instrument.

11. A vibrator apparatus which includes, a work-performing vibrator unit embracing a magnetostrictive driving transducer, a vibration transmitting connecting body rigidly fixed to one end of said driving transducer, an energizing coil in surrounding relation to said driving transducer and operative to produce a high frequency alternating magnetic field which energizes said driving transducer with resultant vibration of said transducer and connecting body in the longitudinal mode, said vibration transmitting connecting body having a longitudinal length substantially corresponding to one-half wavelength of sound or integral multiplies thereof traveling longitudinally through the material thereof at the frequency of vibration of said driving transducer when energized so as to present at least one anti-node of radial vibration along the length thereof, a power generator for converting line current into biased alternating current at a frequency band within the resonance frequency of said vibrator unit, an adjustable tuning circuit operative to adjust the frequency of the biased alternating current output from said generator to the resonance frequency of said vibrator unit, a manually adjustable tuning instrument within convenient reach of the operator and electrically connected to said tuning circuit and to said winding and whereby said tuning circuit can be manipulated to adjust the biased alternating current supplied to said winding in accordance with the resonance frequency of said vibrator unit, and means for sensing and indicating the amplitude of vibration of the connecting body and any amplitude departure from resonance amplitude and which can be restored by a corresponding manual adjustment of said tuning instrument, said sensing and indicating means including a sensing device supported independently of said connecting body but adjacent an anti-node area thereof and operative to convert the sensed amplitude of vibration of said connecting body into correspondingly variable electrical current, and an amplitude instrument electrically connected to said sensing device and operative to translate the fluctuations in current received from said sensing device into readable variations in amplitude of vibration of said connecting body.

12. Vibrator apparatus which includes, a vibrator unit having a magnetostrictive driving transducer, a vibration transmitting connecting body rigidly fixed to one end of said driving transducer, a work-performing element rigidly fixed to the other end of the connecting body, said vibration transmitting connecting body having a longitudinal length substantially corresponding to one-half wavelength of sound or integral multiples thereof traveling longitudinally through the material thereof at the frequency of vibration of said driving transducer when energized so as to present at least one anti-node of radial vibration along the length thereof, an energizing coil in surrounding relation to said driving transducer and operative to produce a high frequency alternating magnetic field which energizes said driving transducer and causes said vibrator unit to vibrate in the longitudinal mode, a power generator for converting line current into biased alternating current at a frequency band within the resonance frequency of said vibratory unit, an adjustable tuning circuit operative to adjust the frequency of the biased alternating current output from said generator to the resonance frequency of said vibrator unit, a manually adjustable tuning instrument within convenient reach of the operator and electrically connecting said tuning circuit and energizing coil and whereby said tuning circuit can be manipulated to adjust the biased alternating current output from said generator to the resonance frequency of said vibrator unit, and means for sensing and indicating the amplitude of vibration of the connecting body of said vibrator unit and any departure thereof from resonance amplitude and which can be restored by a corresponding manual adjustment of said tuning instrument, said sensing and indicating means including a device for sensing the amplitude of vibration of the connecting body of the vibrator unit and converting the sensed amplitude into correspondingly variable electrical current, means for supporting said sensing device in vibration responsive relation adjacent an anti-node of vibration of said connecting body and in vibration insulated relation with respect to other vibrated parts of the apparatus, an electric meter electrically connected to said sensing device and whose current output varies in accordance with the variable current input received by said electric meter from said sensing device, and an amplitude indicator connected to said electric meter and operative to translate the fluctuations in current received by said electric meter into readable variations in amplitude of vibration of said connecting body.

13. A vibrator apparatus which includes, a vibrator unit having a magnetostrictive driving transducer, a vibration transmitting connecting body having one end thereof rigidly fixed to one end of said driving transducer and whose opposite end is to be vibrated to perform work, means for energizing said driving transducer to thereby longitudinally vibrate said connecting body, said vibration transmitting connecting body having a longitudinal length substantially corresponding to one-half wavelength of sound or integral multiplies thereof traveling longitudinally through the material thereof at the frequency of vibration of said driving transducer when energized and whereby said connecting body presents at least one antinode of vibration along the length thereof, a device for detecting and monitoring variations in the amplitude of vibration of said connecting body, said device including a vibration sensitive means, means for supporting said vibration sensitive means in vibration responsive relation adjacent an anti-node area of vibration of said connecting body and in vibration insulated relation to other vibrated parts of said apparatus, conductors connected to said vibration sensitive means through which variations in electrical potential generated by said vibration sensitive means are transmitted when said connecting body is vibrated by said energized driving transducer, and means for translating the variations in electrical potential transmitted by said conductors into variations in amplitude of vibration of said connecitng body when said driving transducer is energized.

14. A vibrator apparatus which includes, a vibrator unit having a magnetostrictive driving transducer, a vibration transmitting connecting body having one end thereof rigidly fixed to one end of said driving transducer and whose opposite end is to be vibrated to perform work, means for energizing said driving transducer to thereby longitudinally vibrate said connecting body, said vibration transmitting connecting body having a longitudinal length substantially corresponding to one-half wavelength of sound or integral multiples thereof traveling longitudinally through the material thereof at the frequency of vibration of said driving transducer when energized and whereby said connecting body presents at least one antinode of radial vibration and an area of maximum stress at a transverse cross-section thereof, a device for detecting and monitoring variations in the amplitude of vibration of said connecting body, said device including a vibration sensitive means, means for supporting said vibration sensitive means in spaced relation to said connecting body but nevertheless in vibration responsive relation adjacent an anti-node area of radial vibration of said connecting body and in vibration insulated relation to other vibratory parts of said apparatus, conductors electrically connected to said vibration sensitive means through which variations in electrical potential generated by said vibration sensitive means are transmitted when said connecting body is vibrated by said energized driving transducer, and means for translating the variations in electrical potential transmitted by said conductors into variations in amplitude of vibration of said connecting body when said driving transducer is energized.

No references cited.

MILTON O. HIRSHFIELD, *Primary Examiner.*